US005552960A

United States Patent [19]
Nelson et al.

[11] Patent Number: 5,552,960
[45] Date of Patent: Sep. 3, 1996

[54] COLLAPSIBLE COOLING APPARATUS FOR PORTABLE COMPUTER

[75] Inventors: Daryl J. Nelson; Scott L. Noble, both of Beaverton, Oreg.

[73] Assignee: Intel Corporation, Santa Clara, Calif.

[21] Appl. No.: 227,779

[22] Filed: Apr. 14, 1994

[51] Int. Cl.⁶ .............................. H05K 7/20; G06F 1/20
[52] U.S. Cl. .................... 361/687; 361/704; 174/16.3; 165/104.33
[58] Field of Search .................... 361/683–704, 361/715; 165/46, 61; 267/150, 160; 174/16.3

[56] References Cited

U.S. PATENT DOCUMENTS

| | | |
|---|---|---|
| 4,092,697 | 5/1978 | Spaight . |
| 4,326,215 | 4/1982 | Suzuki et al. . |
| 4,360,141 | 11/1982 | Kensrue . |
| 4,415,025 | 11/1983 | Horvath . |
| 4,530,003 | 7/1985 | Blair et al. . |
| 4,538,168 | 8/1985 | Van Dyk Soerewyn . |
| 4,603,374 | 7/1986 | Wasielewski . |
| 4,605,058 | 8/1986 | Wilins . |
| 4,771,365 | 9/1988 | Cichocki et al. . |
| 4,777,560 | 10/1988 | Herrell et al. . |
| 4,825,337 | 4/1989 | Karpman ................. 174/16.3 |
| 4,833,567 | 5/1989 | Saaski et al. . |
| 4,833,766 | 5/1989 | Herrell et al. . |
| 4,888,637 | 12/1989 | Sway-Tin et al. . |
| 5,028,984 | 7/1991 | Ameen et al. . |
| 5,105,259 | 4/1992 | McShane et al. . |
| 5,128,829 | 7/1992 | Loew ................. 361/683 |
| 5,172,213 | 12/1992 | Zimmerman . |
| 5,180,001 | 1/1993 | Okada et al. . |
| 5,213,153 | 5/1993 | Itoh . |
| 5,227,663 | 7/1993 | Patil et al. . |
| 5,253,702 | 10/1993 | Davidson et al. . |
| 5,289,039 | 2/1994 | Ishida et al. . |

FOREIGN PATENT DOCUMENTS

| | | |
|---|---|---|
| 60-7155 | 1/1985 | Japan . |
| 60-137042 | 7/1985 | Japan . |
| 61-39555 | 2/1986 | Japan . |
| 63-47959 | 2/1988 | Japan . |
| 63-55966 | 3/1988 | Japan . |
| 63-205935 | 8/1988 | Japan . |
| 1-31443 | 2/1989 | Japan . |
| 1-59841 | 7/1989 | Japan . |
| 2-49457 | 2/1990 | Japan . |
| 2-237055 | 9/1990 | Japan . |
| 3-78246 | 4/1991 | Japan . |
| 1691913 | 11/1991 | U.S.S.R. . |

OTHER PUBLICATIONS

"High Performance Air Cooled Heat Sinks for Integrated Circuits" Claude Hilbert et al. IEEE Transactions on Components Hybrids, and Manufacturing Technology, vol. 13, No. 4, Dec. 1990.
Cunavelis er al., "External Module Heat Sink Fastened to Board" IBM Technical Disclosure Bulletin, vol. 14, No. 1, Jun. 1971, p. 182.

(List continued on next page.)

Primary Examiner—Leo P. Picard
Assistant Examiner—Jayprakash N. Gandhi
Attorney, Agent, or Firm—Blakely, Sokoloff, Taylor & Zafman

[57] ABSTRACT

A collapsible heat sink for cooling heat generated by components in a computer system. The heat sink is positioned in an open space formed between a base casing and a bottom cover of the computer system. The heat sink comprises folding fins and cold plates made of conductive surfaces. When the heat sink is in an open position, the folding fins are in an extended position. In the open position, the heat sink exposes the conductive surfaces including the cold plates and the folding fins in the extended position, thereby dissipating the heat generated by the components of the computer system. In a collapsed position of the heat sink, the folding fins are folded. In the collapsed position, the heat sink fits in a minimal space formed between the bottom cover and the base casing of the computer system. As a result, the heat sink consumes minimal additional space.

52 Claims, 4 Drawing Sheets

OTHER PUBLICATIONS

Almquist et al., "Spring–Clip Mounted Extruded Aluminum Heat Sink", IBM Technical Disclosure Bulletin, vol. 23, No. 12, May 1981, p. 5303.

"Low Profile Heat Sink", IBM Technical Disclosure Bulletin, vol. 28, No. 12, May 1986, pp. 5172–5173.

"Stick–On Heat Sink", Research Disclosure, No. 270, Oct. 1986, 27104.

Conners, P. M., "Variable Area Heat Sink Device" IBM Technical Disclosure Bulletin, vol. 17, No. 4, Sep. 1974, p. 1016.

Dimitroff, Michael, *Magnesium Die Casting for Computer Enclosures,* Computer Packaging Technology—Mar. 1994.

FIG_1

FIG_2

FIG_3

FIG_4

FIG_7

FIG_8

FIG_9

COLLAPSIBLE COOLING APPARATUS FOR PORTABLE COMPUTER

BACKGROUND OF THE INVENTION

1. Field of the Invention

The present invention pertains to the field of computer systems. More specifically, the present invention relates to cooling apparatuses for cooling components that generate heat in computer systems.

2. Description of Related Art

Portable computer systems are generally designed compact for ease of transportation. Portable computer systems also typically operate using a set of transportable batteries that supply energy for operation of various components in the portable computer systems.

Portable computer systems include components such as processors that generate heat when the portable computer system is in operation. Earlier processors developed until 1980s typically generated heat in the 2–3 Watts range. Today, modern processors can generate heat exceeding 10 Watts. Modern processors are generating such excessive heat because of the inclusion of a large number of transistors and the high speed at which they operate.

The excessive heat generated by modern processors can raise the operating temperature of the processors above a manufacturer recommended threshold temperature if the heat is not properly dissipated. Heated processors can malfunction and generate incorrect results. The reliability of heated processors can also be degraded. It is important, therefore, to dissipate the heat generated by the processors in order to maintain the operating temperature of the processors below the recommended threshold temperature.

Cooling systems have been employed in prior computer systems to dissipate the heat generated by the processors. The cooling systems are generally designed to dissipate a sufficient amount of heat to maintain the operating temperature of processors below the recommended threshold temperature.

One prior cooling system includes a heat sink comprising a heat transfer surface. The heat sink is typically positioned on a printed circuit board which also houses other components, such as memory and processor. A base casing generally encloses the printed circuit board and the components mounted on the printed circuit board. The heat sink is thermally coupled to the processor and thus provides additional heat transfer surface area for dissipating heat generated by the processor.

However, the amount of heat transfer surface area that can be provided by the heat sink is limited because there is only a fixed amount of space on the printed circuit board and several components share that fixed space. Such limited heat transfer surface area is not typically sufficient to dissipate adequate amount of heat to maintain the operating temperature of the processor below the recommended threshold temperature. Also, the limited air circulation in the base casing limits the heat dissipation.

Some prior cooling systems have further employed a fan to increase the air circulation around the heat sink. The increased air circulation typically causes increased heat dissipation from the heat sink. The fan is also generally mounted on the printed circuit board in the base casing.

Unfortunately, cooling systems which utilize fan and heat sink are undesirable in portable computer systems because of space and power requirements. The base casing may need to be designed with more height to accommodate the fan. Such increased height of the base casing makes portable computer systems less convenient for transportation. Further, the heat sink and the fan together occupy excessive space on the printed circuit board. The limited space availability on the printed circuit board may force the designer of the computer system not to include other components on the printed circuit board.

Moreover, the fan consumes considerable energy. The additional energy is generally supplied from the batteries which also supply energy for other components of the portable computer system. Since the batteries store only a limited amount of energy, such additional energy consumption for the fan decreases the lifetime of the batteries. In addition, fans typically have a higher failure rate than other components of the computer system, making the overall computer system less reliable.

Another prior cooling system increases heat dissipation by using a base casing made of thermally conductive material such as magnesium. A thermally conductive path is provided between the processor and the base casing. The base casing generally has several surfaces that are exposed to the air outside of the computer system. The conductive surfaces of the base casing dissipate the heat generated by the processor.

Unfortunately, conductive material such as magnesium is generally expensive which results in an increased cost of the overall portable computer system. In addition, the base casing does not have sufficient surface area to dissipate high amounts of heat generated by modern processors.

SUMMARY OF THE INVENTION

The present invention describes a heat sink for cooling a processor in a portable computer system. The heat sink has an open position and a collapsed position. In essence, the heat sink dissipates heat generated by the processor in the open position and occupies minimal additional space in the collapsed position. This makes the heat sink suitable for portable devices.

The portable computer system utilizing the present invention includes a base casing coupled to a bottom cover with a pivot. The heat sink is positioned between the base casing and the bottom cover. In an operative position of the computer system, an open space exists between the base casing and the bottom cover. When the computer system is in the operative position, the heat sink is in the open position dissipating heat generated by the processor.

The portable computer system also has an inoperative position in which minimal space exists between the base casing and the bottom cover. When the portable computer system is in the inoperative position, the heat sink is in the collapsed position so as to fit in the minimal space.

A first preferred embodiment of the heat sink comprises two folding fins, a top cold plate, and a bottom cold plate, each made of a conductive material. Each folding fin is thermally coupled to both the cold plates. The top cold plate is further coupled to the processor using a thermal interface. As a result, a thermal path exists between the processor and the bottom cold plate. This allows heat generated by the processor to be conducted to folding fins and cold plates, which dissipate the conducted heat.

In the open position of the heat sink, the folding fins are in an extended position because of the open space between the two cold plates. The heat sink exposes the conductive surfaces of the folding fins in the extended position, and the two cold plates to air in the open space. The conductive surfaces dissipate heat generated by the processor, thereby cooling the processor.

In the collapsed position of the heat sink, the folding fins are in a folded position. The folded position of the folding fins permits the heat sink to fit in the minimal space between the base casing and a bottom cover. Thus, the heat sink consumes minimal additional space in the collapsed position.

The present invention also includes a mechanism by which the heat sink is opened and collapsed in coordination with opening and closing of a display monitor of the computer system.

A second preferred embodiment of the collapsible heat sink comprises only one folding fin and a top cold plate. The second embodiment operates similar to the first embodiment. The folding fin is connected to the top cold plate and to a bottom cover of the computer system. The folding fin is in extended position or folded position according to the distance between the bottom cover and the top cold plate.

The second preferred embodiment also includes a mechanism to open and collapse the heat sink in coordination with the opening and closing of the display monitor. In the open position, the heat sink dissipates heat generated by the processor. The folding fin is in the extended position in the open position of the heat sink, and accordingly exposes additional conductive surface area to air. This results in increased heat dissipation. In the closed position, the second embodiment of the heat sink also fits in the cavity formed by the bottom cover and the base casing.

BRIEF DESCRIPTION OF THE DRAWINGS

The present invention is illustrated by way of example and not limitations in the figures of the accompanying drawings in which like references indicate similar elements, and in which.

DETAILED DESCRIPTION OF THE PRESENT INVENTION

A collapsible heat sink adapted for use in portable computer systems is described. In the following description, numerous specific details, such as the dimensions of components, the material used for making other components, etc., are set forth in order to provide a thorough understanding of the present invention. It will be obvious, however, to one skilled in the art that the present invention may be practiced without these specific details. In other instances, well-known structures such as screw attachments, pivots, etc., have not been described in detail in order not to unnecessarily obscure the present invention.

Figure 1:
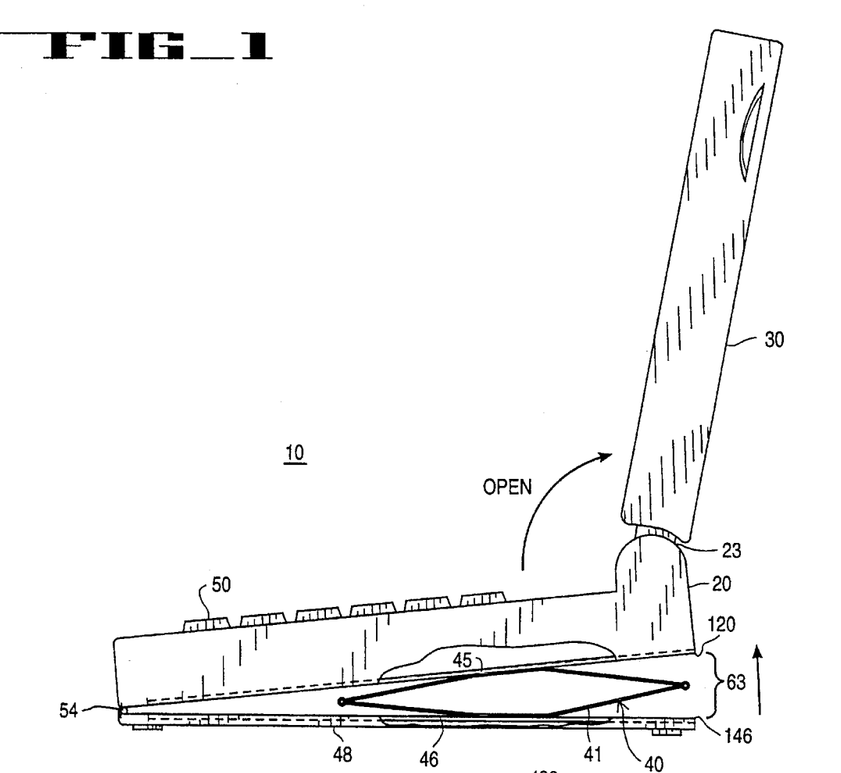
FIG. 1 illustrates a side view of a portable computer system in an operative position comprising a base casing, a display monitor, a collapsible heat sink of the present invention, and a key board.

FIG. 1 illustrates a side view of a portable computer system 10 of the present invention in an operative position. The portable computer system 10 comprises a base casing 20, a display monitor 30, a first preferred embodiment of a collapsible heat sink 40, a key board 50, and a bottom cover 48.

As will be described, the computer system 10 is designed to advantageously have an open space 63 between the base casing 20 and the bottom cover 48 when the computer system is in the operative position. The heat sink 40 is positioned between the base casing 20 and the bottom cover 48. When the computer system 10 is in the operative position, the heat sink 40 is in an open position so as to maximize dissipation of heat generated by a processor of the computer system 10.

Figure 5:
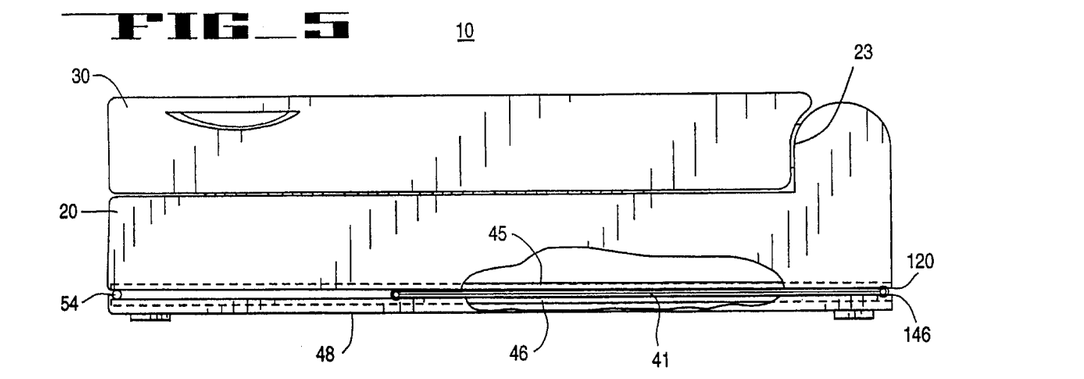
FIG. 5 illustrates a side view of the portable computer system in an inoperative position with the first preferred embodiment of the collapsible heat sink in a collapsed position.

It will be further shown with reference to FIG. 5 that there is a minimal space between the base casing 20 and the bottom cover 48 in an inoperative position of the computer system 10. In the inoperative position of the computer system 10, the heat sink 40 is designed to be in a collapsed position so as to fit into the minimal space between the base casing 20 and the bottom cover 48.

With reference to FIG. 1, the display monitor 30 is attached to the base casing 20 about a pivotal connection 23. The display monitor 30 opens to a substantially vertical position about the pivotal connection 23. Similarly, the display monitor 30 closes about the pivotal connection 23.

The base casing 20 encloses the processor which generates heat. It will be appreciated that the operation of the present invention is explained with reference to the processor for illustration purposes only. The present invention can be practiced to dissipate heat generated by other components of the computer system also.

The bottom cover 48 is connected to the base casing 20 using a pivot 54. Pivotal motion between the bottom cover 48 and the base casing 20 about the pivot 54 results in a change in a relative distance between the edge 120 of the base casing 20, and the edge 146 of the bottom cover 48.

In the operative position of the computer system 10, the edges 146 and 120 are separated so as to form the open space 63. A side view of the open space 63 is shown as a triangular area with the pivot 54, and the edges 120 and 146 as the three vertex of the triangle.

The heat sink 40 is in the open position in the open space 63. In the open position, the heat sink 40 exposes heat transfer surfaces to air in the open space 63. The heat sink 40 is thermally coupled to the processor of the computer system and dissipates substantial portion of heat generated by the processor.

In order to maximize heat dissipation, the heat sink 40 of the present invention includes a set of heat transfer surfaces including a top cold plate 45, a bottom cold plate 46 and a pair of folding fins 41 and 42 (Folding fin 42 is not shown in FIG. 1). Each folding fin 41 and 42 is thermally coupled to the cold plates 45 and 46. The top cold plate 45 is coupled to the processor by a thermal conductive interface.

The cold plates 45 and 46, and the folding fins 41 and 42 are each made out of a thermally conductive material such as copper or aluminum. This causes the cold plates 45 and 46, and the folding fins 41 and 42 to maximize heat dissipation.

It is to be appreciated that the cold plates and the folding fins may be made out of other conductive material to meet the specific design requirements of the computer system 10. For example, copper is a better conductor than aluminum and accordingly dissipates more heat in a specified time. However, copper is more expensive and heavier than aluminum. Thus, copper may be chosen if the portable computer system requires more heat dissipation, and cost and weight are not factors.

The bottom cold plate 46 is rigidly connected to the bottom cover 48 such that the bottom cold plate 46 moves along with the bottom cover 48. The bottom cover 48 is made of thermally non-conductive material such as plastic, and shields a user of the portable computer system 10 from the heat dissipated by the heat transfer surfaces of the heat sink 40.

Figure 2:
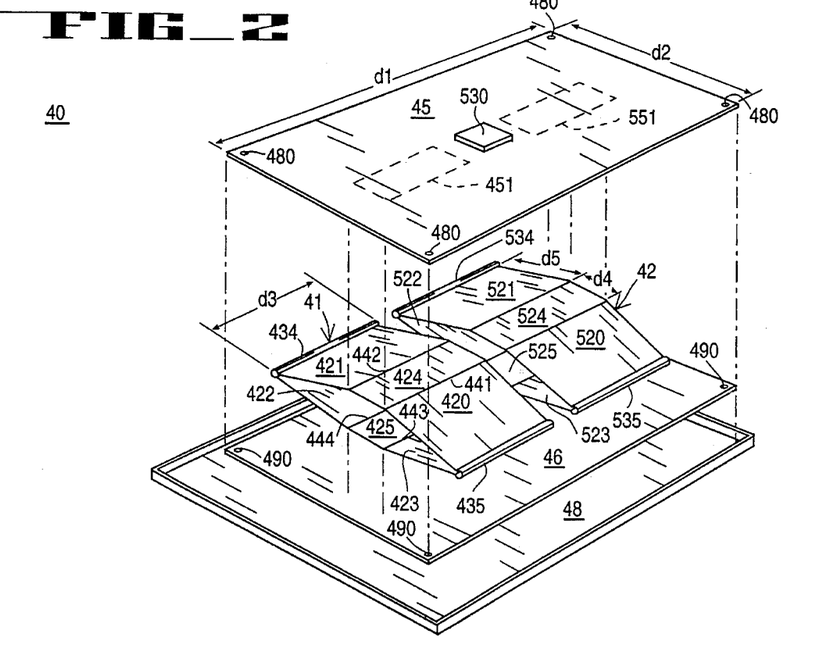
FIG. 2 illustrates an exploded view of the first preferred embodiment of the collapsible heat sink of the present invention comprising two folding fins and two cold plates.

FIG. 2 illustrates an exploded view of the first preferred embodiment of heat sink 40. The heat sink 40 comprises the top cold plate 45, the bottom cold plate 46, and the folding fins 41 and 42.

In the preferred embodiment, each folding fin 41 and 42 is made by folding a foil made of conductive material such as copper. The foil is roughly 0.010" thick and is malleable enough to be folded into the folding fin 41 and 42. The foil thickness is also chosen to be strong enough to withstand continual folding and unfolding operations of the folding fins 41 and 42 as described later with reference to FIG. 4.

The structure of the folding fins is chosen such that it can be constructed by folding a foil. This simplifies the construction of the folding fins 41 and 42. The structure of the folding fins 41 and 42 is described below. It will be appreciated by one skilled in the art that the folding fins 41 and 42 can be of other shapes or can be constructed using a different method or material without departing from the spirit and scope of the present invention.

The folding fin 41 comprises a set of fin surfaces 420–425. The fin surfaces 421 and 422 are connected by a c-fold 434. Similarly, the fin surfaces 420 and 423 are connected by another c-fold 435. The fin surface 424 is connected to the fin surface 421 by a fold 442, and to the fin surface 420 by a fold 441. Similarly, the fin surface 425 is connected to the fin surface 422 by a fold 444, and to the fin surface 423 by a fold 443. The c-folds 434 and 435, and the folds 441–444 permit the folding fin 41 to be folded and extended as explained later with reference to FIG. 4.

The upperside of the fin surface 424 is rigidly attached to an area 451 (shown by dots) on the underside of the upper cold plate 45. Similarly, the underside of fin surface 425 is attached to the lower cold plate 46. The folding fin 41 is constructed from the foil such that the edges of the foil (not shown in figure) are continuous and located in the fin surface 425. The attachments of the folding fin 41 to the cold plates 45 and 46 are accomplished using a thermal interface such as epoxy or soldering. It will be obvious to one skilled in the art that other types of thermal attachments may be employed without departing from the scope and spirit of the present invention.

Similarly, the folding fin 42 comprises fin surfaces 521 and 522 connected by a c-fold 534, and fin surfaces 520 and 523 connected by a c-fold 535. The fin surface 524 is connected to fin surfaces 520 and 521, and the fin surface 525 is connected to fin surfaces 522 and 523 (The folds connecting these surfaces are not numbered to avoid crowding the figure with more reference numbers). The folding fin 42 further includes a fin surface 524 which is rigidly coupled to the underside of the top cold plate 45 at an area 551 (shown by dots), and another fin surface 525 which is rigidly coupled to the bottom cold plate 46.

In an exemplary embodiment of the folding fin 40, each cold plate 45 and 46 is approximately 9" long (shown as d1 in FIG. 2), 6" wide (shown as d2) and 0.020" thick. Each folding fin 41 and 42 is approximately 3" along dimension d3. The fin surfaces 420–423 and 520–523 have approximately equal dimensions. Each of the fin surfaces 420–423 and 520–523 is approximately 3" long (d3) and 2" wide (d5). Similarly, each of the fin surfaces 424, 425, 524 and 525 is 3" long (d3) and 1" (d4) wide.

The upper cold plate 45 is attached to the processor of the portable computer system 10 using a thermal conductive interface 530. The structure of the thermal conductive interface 530 is described with reference to FIG. 7. For present, it is sufficient to note that the thermal conductive interface 530 conducts the heat generated by the processor to the upper cold plate 45.

The upper cold plate 45 is rigidly connected to the base casing 20 by means of the screw attachments 480 such that the cold plate 45 moves along with the base casing 20. Similarly, the lower cold plate 46 is rigidly connected to the bottom cover 48 by means of screw attachments 490. These attachments can also be by adhesives instead of by screws.

Figure 3:
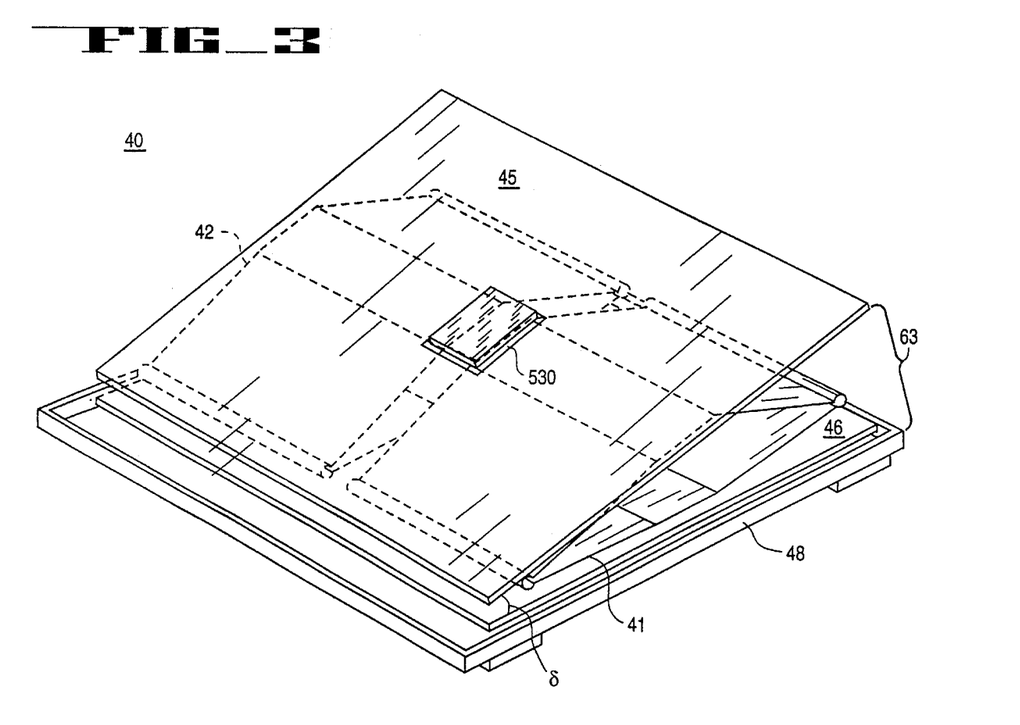
FIG. 3 illustrates an assembled view of the first preferred embodiment of the collapsible heat sink in an open position.

FIG. 3 illustrates a perspective view of the assembled heat sink 40 in the open position. In the open position of the heat sink 40, an angle $\delta$ is present between the upper cold plate 45 and the lower cold plate 46. The preferred embodiment of the heat sink 40 is designed such that angle $\delta$ is approximately 6°. It will be apparent to one skilled in the art that the angle $\delta$ can be a different value without departing from the scope of the present invention. In the open position, the heat sink 40 exposes heat transfer surfaces including the underside of the upper cold plate 45, the upperside of the lower cold plate 46, and the fins 41 and 42 to air in the open space 63.

The heat generated by the processor raises the temperature of the cold plates 45 and 46, and the folding fins 41 and 42 to above the temperature of surrounding air in the open space 63. The temperature of the cold plate 45 increases because heat is conducted from the processor to the cold plate 45 via the thermal conductive interface 530. The cold plate 45, in turn, heats the folding fins 41 and 42 because the fins 41 and 42 are thermally coupled to the upper cold plate 45. The folding fins 41 and 42 heat the lower cold plate 46 because the fin surfaces 425 and 525 are thermally attached to the lower cold plate 46. As the temperature of the folding fins 41 and 42 increases, the cold plate 46 is also heated.

The temperature difference between air in the open space 63 and the heat transfer surfaces causes the folding fins 41 and 42, and cold plates 45 and 46 to dissipate heat into the surrounding air via natural convection. The folding fins 41 and 42, and the cold plates 45 and 46 dissipate an increased amount of heat because the folding fins 41 and 42, and the cold plates 45 and 46 are made of thermally conductive material. The heat dissipation cools the processor.

The dissipated heat causes formation of convection air currents. The dissipated heat heats the air surrounding the cold plates 45 and 46 and the folding fins 41 and 42. The density of air decreases as the air gets heated. As a result, the heated air rises to the top of the heat sink 40. As the heated air rises to the top, cooler air from outside is drawn from the lower portion of the heat sink 40. Also, due to the angle of opening δ, air is drawn from the front, i.e. closer to the pivot 54, of the heat sink 40. The heated air leaves from the top portion of the rear and the sides of the heat sink 40.

Figure 4:
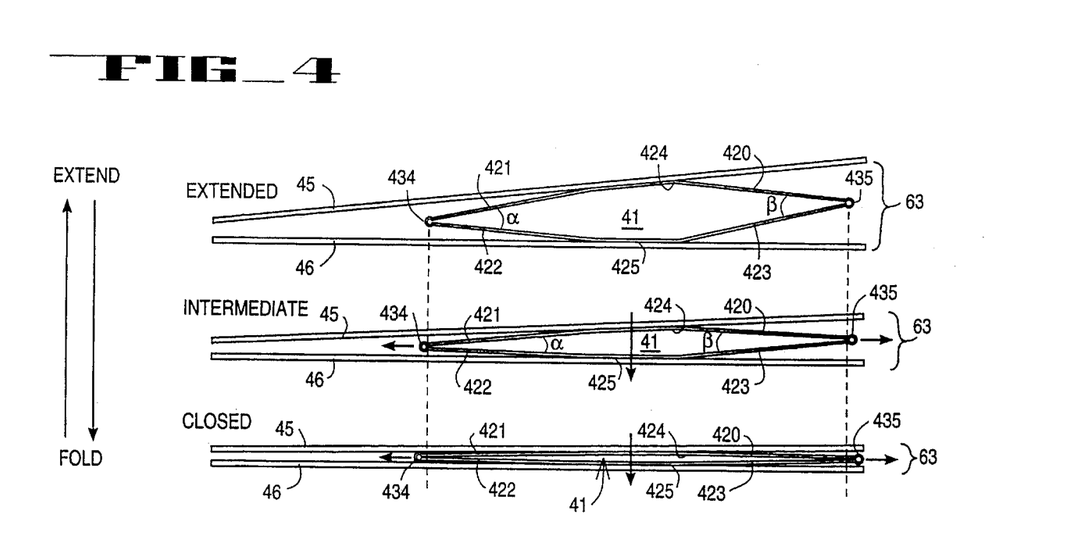
FIG. 4 illustrates a side view of the folding fins in a folded position, in an extended position and in an intermediate position between the folded and the extended positions.

FIG. 4 illustrates a folding operation of the folding fin 41. A side view of the folding fin 41 is shown in three positions, an extended position, an intermediate position and a folded position. The c-folds 434 and 435, and folds 441–444 permit the folding fin 41 to be operable in these positions. In FIGS. 1–3, the folding fins 41 and 42 are shown in the extended position.

The folding fin 41 gradually changes from an extended position to the folded position as the top cold plate 45 is drawn closer to the bottom cold plate 46. The open space 63 between the two cold plates 45 and 46 decreases as the two cold plates 45 and 46 are drawn closer.

As the top cold plate 45 is drawn closer to the bottom cold plate 46, the folding fin 41 continues to fold because the fin surfaces 424 and 425 are rigidly attached to the cold plates 45 and 46 respectively. An angle α between the fin surfaces 421 and 422 decreases as the folding fin continues to fold. Similarly, an angle α between the fin surfaces 420 and 423 also continues to decrease as the folding fin 41 continues to fold. The heat sink 40 is designed such that angle α is approximately fifteen degrees and angle β is approximately eighteen degrees in the extended position.

In the folded position, the members 420, 424 and 421 in the top half of the folding fin 41 are substantially parallel to the corresponding members 423, 425 and 422 in the bottom half of the folding fin 41. An intermediate position between the extended position and the folded position as the cold plates 45 and 46 are drawn closer is also shown.

The operation of extending the folding fin 41 from a folded position to an extended position is similarly explained. As the cold plates 45 and 46 are drawn farther apart, the angles α and β increase correspondingly. Similarly, the folding fin 42 is also operable between an extended position and a closed position.

The folding fins 41 and 42 are folded as the heat sink 40 collapses. The heat sink 40 occupies minimal space because the folding fins 41 and 42 are folded. The folding fins 41 and 42 are gradually drawn to the extended position as the heat sink 40 opens. The folding fins 41 and 42 are in the extended position when the heat sink 40 is in the open position. In the open position, the heat sink 40 dissipates heat generated by the processor.

FIG. 5 illustrates a side view of the portable computer system 10 in an inoperative position. The display monitor 30 is closed about the pivotal connection 23.

In the inoperative position of the portable computer system 10, the edge 120 of the base casing 20 is close to the edge 146 of the lower plate 48 such that there is minimal space between the base casing 20 and the bottom plate 48. Accordingly, the heat sink 40 is in the collapsed position. When the heat sink 40 is in the collapsed position, the folding fins 41 and 42 (only 41 shown) are in the folded position.

In the collapsed position, the heat sink 40 fits in the minimal space between the base casing 20 and the bottom coner 48. As a result, the portable computer system 10 occupies minimal additional space because of the heat sink 40.

Figures 6A, 6B:
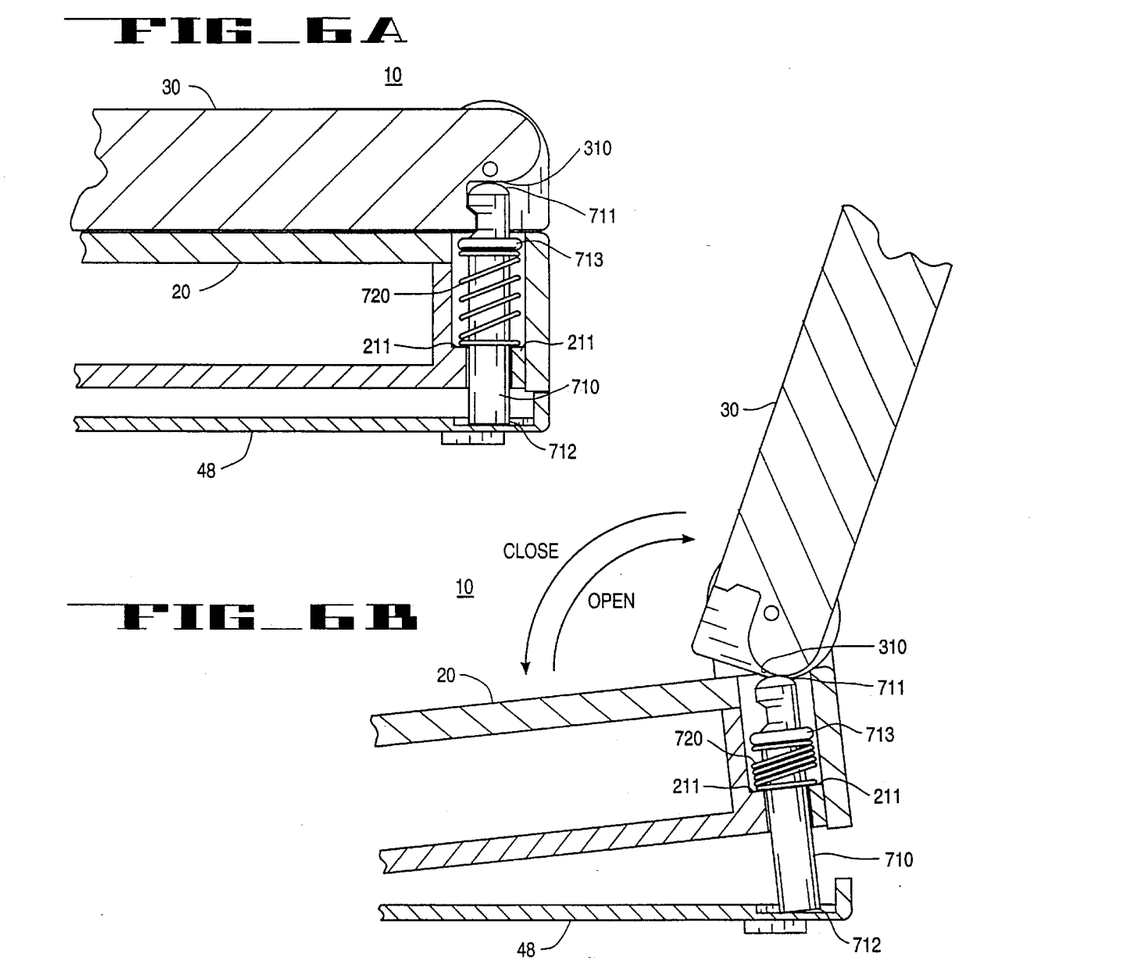
FIG. 6a illustrates a side view of the portable computer system in the inoperative position with an arrangement to open and collapse the collapsible heat sink in coordination with the opening and closing of the display monitor.
FIG. 6b illustrates a side view of the portable computer system in the operative position with the arrangement to open and collapse the collapsible heat sink in coordination with the opening and closing of the display monitor.

FIG. 6A and 6B illustrate an arrangement whereby the heat sink 40 is opened and collapsed in coordination with the opening or closing of the display monitor 30. The arrangement is not shown in other diagrams of the present application in the interest of clarity in explaining each aspect of the present invention. The computer system 10 is shown with the display monitor 30 closed in FIG. 6a, and with the display monitor 30 open in FIG. 6b.

The arrangement comprises a plunger 710 and a compression spring 720. The plunger 710 is positioned relative to the display monitor 30 such that a surface edge 310 of the display monitor 30 gradually pushes an end 711 of the plunger 710 downward while the display monitor 30 is opened.

The other end 712 of the plunger 710 is connected to the bottom cover 48. As a result, the bottom cover 48 moves along with the movement of the plunger 710. The shapes of surface edge 310 and the end 711 are designed such that the display monitor 30 pushes the plunger 711 a desired distance to open the heat sink 40 a desired amount. As explained with reference to FIG. 3, the angle of opening δ in the preferred embodiment of the heat sink 40 is approximately 6°. Hence, the display monitor 30 pushes the plunger 711 such that the bottom cover 48 opens to an angle of approximately 6°.

The spring 720 is gradually compressed between a lip 713 of the plunger 710 and the stop edges 211 of the base casing 20 as the display monitor 30 pushes the plunger 710 downwards. In FIG. 6b, the spring 720 is shown in a compressed state.

The spring 720 urges the plunger 710 upward using the lip 713 and ensures that the edge 711 of the plunger 710 is continuous with the edge surface 310 of the display monitor while the display monitor 30 is closed. As the plunger 710 moves upwards, the bottom cover 48 moves up collapsing the heat sink 40. Because of the spring 720, the heat sink 40 automatically collapses as the display monitor 30 is moved from the open position to the closed position.

The cover of the display monitor 30 locks the plunger 710 in an up position when the display monitor 30 is closed. Such locking holds the heat sink 40 in a collapsed position when the display monitor 30 is closed and the portable computer system 10 is transported.

Thus, when the display monitor 30 is closed, the heat sink 40 is automatically collapsed. On the other hand, if the display monitor 30 is opened, the heat sink 40 is automatically opened. In the open position, the heat sink 40 dissipates heat generated by the processor. In the collapsed position, the heat sink 40 occupies minimal space, thereby facilitating easy transportation of the portable computer system 10.

Figure 7:
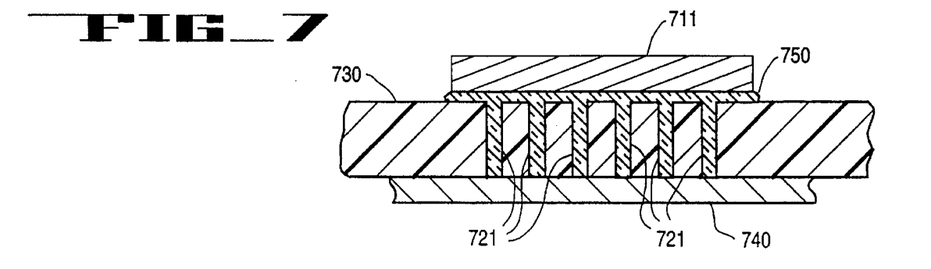
FIG. 7 illustrates a thermal conductive interface between the collapsible heat sink and a processor of the portable computer system.

FIG. 7 illustrates a side view of the thermal conductive interface 530. FIG. 7 also shows a printed circuit board 730 and a processor 711 of the portable computer system 10. The underside of the processor 711 is thermally attached to the thermal conductive interface 530.

The thermal conductive interface 530 comprises a set of thermal vias 721, a conductive attachment 750 and a thermal plate 740. The processor 711 is attached to the conductive attachment 750. The thermal vias 721 comprise holes through the printed circuit board 730, which (i.e. holes) are filled with conductive material such as solder. The thermal vias 721 extend from the conductive attachment 750 down to the thermal plate 740. As a result, the thermal vias 721 conduct heat generated by the processor 710 to the thermal plate 740.

The thermal plate 740 is, in turn, is thermally attached to the top cold plate 45 of the heat sink 40. Thus, the thermal conductive interface 530 provides a thermal path from the processor 710 to the heat sink 40. This allows the heat generated by the processor 710 to be conducted to the heat transfer surfaces of the heat sink 40, which dissipate the conducted heat.

Figure 8:
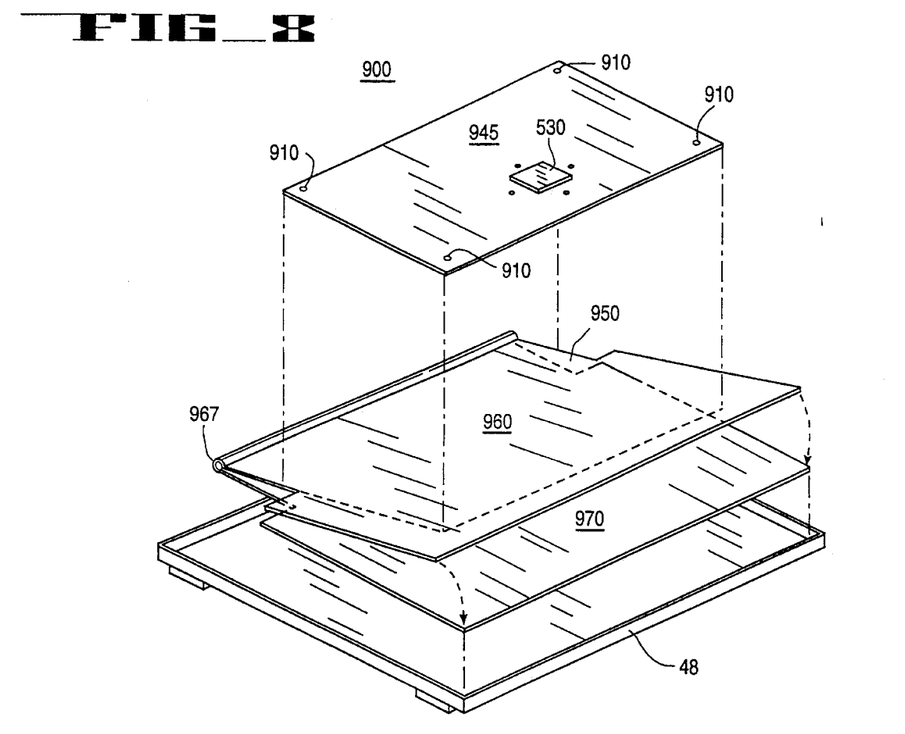
FIG. 8 illustrates an exploded view of an alternative preferred embodiment of the collapsible heat sink of the present invention.

FIG. 8 illustrates an exploded view of a heat sink 900, an alternative preferred embodiment of the present invention. The heat sink 900 is also attached to the base casing 20 and operates similar to the heat sink 40 described with reference to FIGS. 1–5.

The heat sink 900 comprises a folding fin 950 and a top cold plate 945. The top cold plate 945 is screw attached to the underside of the base casing 20 at attachment points 910. The top cold plate 950 further includes the thermal conductive interface 530 to the processor of the portable computer system 10.

The folding fin 950 comprises two fin surfaces 960 and 970 connected by a c-fold 967. The top fin surface 960 is rigidly connected to underside of the top cold plate 945 at an area 965 (shown by dots) by a thermal coupling such as screw attachment, solder or epoxy.

Figure 9:
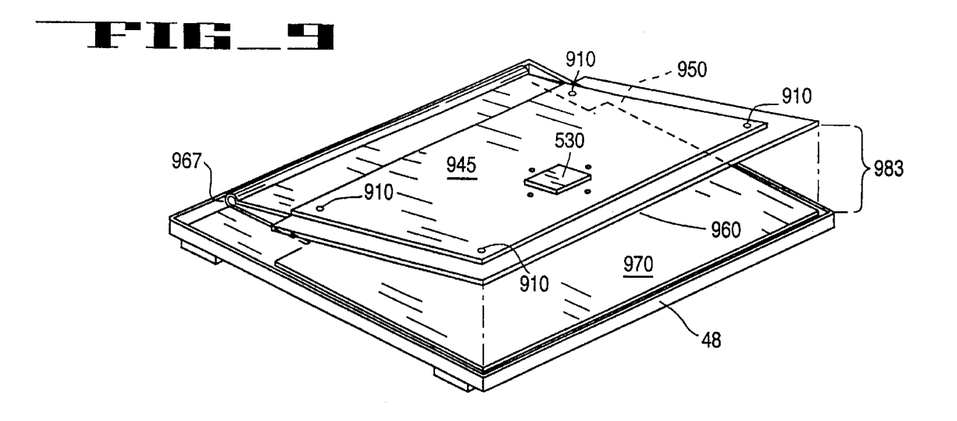
FIG. 9 illustrates an assembled view of the alternative preferred embodiment of the collapsible heat sink.

FIG. 9 shows the assembled view of the heat sink 900 for the alternative embodiment. The heat sink 900 of the alternative embodiment opens and collapses in coordination with the opening and closing of the display monitor 30.

In the open position, the heat sink 900 exposes the heat transfer surfaces 960 and 970 to air in the area 983. The heat transfer surfaces 960 and 970 dissipate heat generated by the processor into air in the area 983, thereby cooling the processor.

The folding fin 950 folds and extends about the c-fold 967. The folding fin 950 folds as the heat sink 900 of the alternative embodiment collapses. In a collapsed position, the heat sink 900 is positioned in a minimal space between the base casing 20 and the bottom plate 48. Thus, the heat sink 900 of the alternative embodiment also occupies minimal space when the display monitor 30 is closed.

The alternative embodiment of heat sink 900 comprises lesser number of fins compared to heat sink 40, and accordingly simplifies the manufacture of the heat sink. However, heat sink 40 provides more heat transfer area because of an additional folding fin surface areas and better thermal link (i.e. the fins 41, 42) to the bottom cold plate. This results in an increased heat dissipation from the heat sink 40.

It will thus be appreciated that the total conductive area in the heat sink to dissipate heat can be increased or decreased by incorporating additional or less number of heat transfer surfaces, or heat transfer surfaces with more or less surface area without departing from the spirit and scope of the present invention.

It will also be appreciated that the cooling operation has been described with reference to a processor in a portable computer system for illustration purposes only. The collapsible heat sink of the present invention can be used to cool other components of any computer system. Similarly, the heat sink of the present invention can be advantageously used in any portable device.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative than a restrictive sense.

What we claim is:

1. A computer system, comprising:

a base casing;

a heat source in said base casing;

a bottom cover coupled to said base casing such that an open space exists between said base casing and said bottom cover in a first position of said computer system, wherein a minimal space exists between said base casing and said bottom cover in a second position of said computer system, wherein said minimal space is smaller than said open space; and a heat sink thermally coupled to said heat source, said heat sink having an open extended position and a collapsed position, wherein movement of said computer system from said first position to said second position causes said heat sink to move from said open extended position to said collapsed position and movement of said computer system from said second position to said first position causes said heat sink to move from said collapsed position to said open extended position.

2. The computer system of claim 1 further comprising a pivot between said bottom cover and said base casing.

3. The computer system of claim 1 wherein said heat sink is capable of dissipating heat generated by said heat source in said open extended position.

4. A heat sink for dissipating heat generated by a heat source, comprising:

a top cold plate thermally coupled to said heat source; and a first folding fin having at least one fold thermally coupled to said top cold plate, said folding fin having an extended position and a folded position.

5. The heat sink of claim 4 further comprising:

a bottom cold plate thermally coupled to said first folding fin; and a bottom cover coupled to said bottom cold plate.

6. The heat sink of claim 5 wherein said first folding fin in said extended position is capable of dissipating heat generated by said heat source, and said first folding fin fits in a minimal space between said top cold plate and said bottom cold plate in said folded position.

7. The heat sink of claim 6 wherein said top cold, said bottom cold plate and said first folding fin each comprise a thermally conductive material.

8. The heat sink of claim 7 wherein said thermally conductive material is selected from the group comprising of copper and aluminum.

9. The heat sink of claim 6 further comprising a second folding fin, said second folding fin also having said folded position and said extended position, said second folding in said extended position capable of dissipating heat generated by said heat source, said second folding fin in said folded position fits in said minimal space.

10. The heat sink of claim 4 further comprising a bottom cover coupled to said first folding fin.

11. The heat sink of claim 10 wherein said first folding fin in said extended position is capable of dissipating heat generated by said heat source, and said first folding fin in said folded position fits in a minimal space between said top cold plate and said bottom cold plate.

12. The heat sink of claim 11 wherein said top cold plate, said bottom cold plate and said first folding fin each comprise a thermally conductive material.

13. The heat sink of claim 12 wherein said thermally conductive material is selected from the group comprising of copper and aluminum.

14. The heat sink of claim 13 wherein said bottom cover comprises a thermally non-conductive material.

15. The heat sink of claim 14 wherein said thermally non-conductive material is plastic.

16. A computer system, comprising:

a base casing;

a heat source in said base casing;

a bottom cover pivotally coupled to said base casing such that an open space exists between said base casing and said bottom cover in a first position of said computer system; and a heat sink thermally coupled to said heat source, said heat sink positioned in said open space, wherein said heat sink has an open position and a collapsed position, said heat sink in said open position when said computer system is in said first position, said heat sink capable of dissipating heat generated by said heat source in said open position, and wherein a minimal space exists between said bottom cover and said base casing in a second position of said computer system, when said computer system is in said second position and said heat sink is in said collapsed position.

17. The computer system of claim 16, wherein when said heat sink is in said collapsed position, said heat sink fits in said minimal space.

18. The computer system of claim 17, wherein said heat sink comprises a first folding fin having an extended position and a folded position, said first folding fin in said extended position when said heat sink is in said open position, said first folding fin in said folded position when said heat sink is in said collapsed position.

19. The computer system of claim 18, wherein said heat sink further comprises a first cold plate and a second cold plate, said first cold plate thermally coupled to a first side of said first folding fin, said first cold plate thermally coupled to said heat source, said second cold plate coupled to a second side of said first folding fin.

20. The computer system of claim 19, wherein said heat sink further comprises a second folding fin, said second folding fin thermally coupled to said first cold plate and said second cold plate.

21. The computer system of claim 19, wherein said first cold plate and said second cold plate each comprise a first thermally conductive material.

22. The computer system of claim 21, wherein said first thermally conductive material is selected from the group comprising of copper and aluminum.

23. The computer system of claim 22, wherein said heat source is a processor of said computer system.

24. The computer system of claim 23, further comprising a printed circuit board in said base casing, said printed circuit board housing said processor.

25. The computer system of claim 24, wherein said first cold plate is coupled to said processor by a thermal conductive interface, said thermal conductive interface comprising:

a set of thermal vias in said printed circuit board, said thermal vias comprising a second thermally conductive material; and a thermal plate thermally coupled to said thermal vias and said first cold plate.

26. The computer system of claim 25, wherein said bottom cover comprises a thermally non-conductive material.

27. The computer system of claim 26, wherein said thermally non-conductive material is plastic.

28. The computer system of claim 23, further comprising a mechanism to open and collapse said heat sink.

29. The computer system of claim 28, further comprising a display monitor connected to said base casing by a pivot.

30. The computer system of claim 29, wherein said mechanism changes said heat sink from said open position to said collapsed position in coordination with opening and closing of said display monitor, said mechanism comprising:

a plunger having a lip, a first end and a second end, said first end of said plunger positioned to be continuous with an edge surface of said display monitor, said display monitor for pushing said plunger downward using said first end when said display monitor is opened, said second end connected to said bottom cover such that said relative distance increases or decreases according to movement of said plunger; and a spring positioned between said lip and a stop end in said base casing, said spring compressing between said lip and said stop end when said plunger is pushed downward, said compressed spring urging said plunger upward using said lip when said display monitor is closed, upward movement of said plunger causing said heat sink to move to said collapsed position.

31. The computer system of claim 18, wherein said first folding fin is a folded foil.

32. The computer system of claim 31, wherein said folded foil comprises a third thermally conductive material.

33. The computer system of claim 32, wherein said third thermally conductive material is selected from the group comprising aluminum and copper.

34. The computer system of claim 18, wherein said heat sink further comprises a cold plate coupled to said bottom cover, said cold plate thermally coupled to a first side of said first folding fin and said heat source.

35. The computer system of claim 34, wherein said bottom cover is coupled to a second side of said first folding fin.

36. A cooling apparatus for cooling a heat source, said cooling apparatus comprising:

a heat sink with a thermal conductive interface to said heat source, said heat sink having an open position and a collapsed position, said heat sink exposing a substantial thermal conductive area in said open position so as to dissipate heat generated by said heat source, said heat sink occupying minimal space in said collapsed position, wherein said heat sink comprises a folding fin having an extended position and a folded position, said folding fin in said extended position when said heat sink is in said open position, said folding fin in said folded position when said heat sink is in said collapsed position, and wherein said heat sink further comprises a first plate and a second plate, said first plate conductively coupled to a first side of said folding fin, said first plate conductively coupled to said heat source to form said thermal conductive interface, said second plate coupled to a second side of said folding fin, wherein said second plate is coupled to said first plate by a pivot; and a thermally non-conductive surface coupled to said second plate.

37. A cooling apparatus for cooling a heat source, said cooling apparatus comprising:

a heat sink with a thermal conductive interface to said heat source, said heat sink having an open position and a collapsed position, said heat sink exposing a substantial thermal conductive area in said open position so as to dissipate heat generated by said heat source, said heat sink occupying minimal space in said collapsed position, wherein said heat sink comprises a folding fin having an extended position and a folded position, said folding fin in said extended position when said heat sink is in said open position, said folding fin in said folded position when said heat sink is in said collapsed position, wherein said folding fin is a folded foil, wherein said folded foil comprises a thermally conductive material which is selected from the group comprising of aluminum or copper, and wherein said heat sink further comprises a cold plate and a thermally non-conductive surface, said cold plate thermally coupled to a first side of said folding fin and said thermal conductive interface, said thermally non-conductive surface coupled to a second side of said folding fin.

38. The cooling apparatus of claim 37 wherein said cold plate and said folding fin each comprise a thermally conductive material.

39. The cooling apparatus of claim 38 wherein said thermally conductive material is selected from the group comprising of copper or aluminum.

40. A computer system, comprising:

a base casing having a first edge;

a heat source in said base casing;

a thermally non-conductive surface member coupled to said base casing, said thermally non-conductive surface member having a first edge such that an open space exists between said first edge of said thermally non-conductive surface member and said first edge of said base casing in a first position of said computer system; and a heat sink thermally coupled to said heat source and said thermally non-conductive surface member, said heat sink is in an open extended position when said computer system is in said first position.

41. The computer system of claim 40, wherein a minimal space exists between said base casing and said thermally non-conductive surface member in a second position of said computer system, and wherein said heat sink is in a collapsed position when said computer system is in said second position.

42. A cooling apparatus for cooling a heat source, said cooling apparatus comprising:

a heat sink with a thermal conductive interface to said heat source, said heat sink having an open position and a collapsed position, said heat sink exposing a substantial thermal conductive area in said open position so as to dissipate heat generated by said heat source, said heat sink occupying minimal space in said collapsed position, and wherein said heat sink includes a folding fin having at least one fold, wherein said folding fin having an extended position and a folded position, said folding fin in said extended position when said heat sink is in said open position, and said folding fin in said folded position when said heat sink is in said collapsed position.

43. The cooling apparatus of claim 42, wherein said folding fin having multiple fin surfaces.

44. The cooling apparatus of claim 43, wherein said folding fin having at least three surfaces for increased heat dissipation.

45. The cooling apparatus of claim 44, wherein said folding fin is a folded foil.

46. The cooling apparatus of claim 45, wherein said folded foil comprises a thermally conductive material.

47. The cooling apparatus of claim 46, wherein said thermally conductive material is selected from the group comprising of aluminum or copper.

48. The cooling apparatus of claim 42, further comprising a cold plate, wherein one of said at least three faces of said folding fin is coupled to said cold plate.

49. The cooling apparatus of claim 42, wherein said heat sink further comprises a first cold plate and a second cold plate, said first cold plate conductively coupled to a first side of said folding fin, said first cold plate conductively coupled to said heat source to form said thermal conductive interface, said second plate coupled to a second side of said folding fin.

50. The cooling apparatus of claim 49, wherein said second plate is coupled to said first plate by a pivot.

51. The cooling apparatus of claim 50, wherein said first plate and said second plate each comprise a thermally conductive material.

52. The cooling apparatus of claim 51, wherein said thermally conductive material is selected from the group comprising of copper and aluminum.

* * * * *

UNITED STATES PATENT AND TRADEMARK OFFICE
CERTIFICATE OF CORRECTION

PATENT NO. : 5,552,960
DATED : September 3, 1996
INVENTOR(S) : Nelson et al.

It is certified that error appears in the above-identified patent and that said Letters Patent is hereby corrected as shown below:

In column 7 at line 33 delete "angle $\alpha$" and insert --angle $\beta$--

In column 8 at line 5 delete "coner 48." and insert --cover 48--.

Signed and Sealed this

Twenty-eighth Day of January, 1997

Attest:

BRUCE LEHMAN

*Attesting Officer*     *Commissioner of Patents and Trademarks*